United States Patent [19]

Solomon

[11] 4,280,052
[45] Jul. 21, 1981

[54] MULTIPLE CHAMBER IONIZATION DETECTOR

[76] Inventor: Elias E. Solomon, 20 Christina Ct., Duxbury, Mass. 02332

[21] Appl. No.: 959,102

[22] Filed: Nov. 9, 1978

[51] Int. Cl.³ .............................................. G01T 1/18
[52] U.S. Cl. ..................................... 250/381; 340/629
[58] Field of Search ............... 250/381, 384, 385, 389; 340/629; 313/54

[56] References Cited

U.S. PATENT DOCUMENTS

| 2,824,246 | 2/1958 | Keller | 313/54 |
| 2,981,840 | 4/1961 | Nahmias | 250/384 |
| 3,295,121 | 12/1966 | Meyer | 340/629 |
| 4,021,671 | 5/1977 | Solomon | 250/381 |

*Primary Examiner*—Bruce C. Anderson

*Attorney, Agent, or Firm*—Wolf, Greenfield & Sacks

[57] ABSTRACT

The detector uses a single radioactive source, such as a beta ionization source, with a multiple chamber construction. The source is positionable relative to the center or node electrode to provide simple adjustment of ionization in each chamber of say a dual chamber detector. Adjustment may be achieved without altering the geometric volume of the chambers or electrode spacing, but instead by altering the ratio of the source area protruding into each chamber. In one embodiment the center or node electrode is fixed and the source is adjustable in a direction normal to the electrode or by tilting relative to the electrode. In another embodiment the source is fixed and the electrode is adjustable relative to the position of the source. The principles may also be embodied in a three-chamber detector.

14 Claims, 9 Drawing Figures

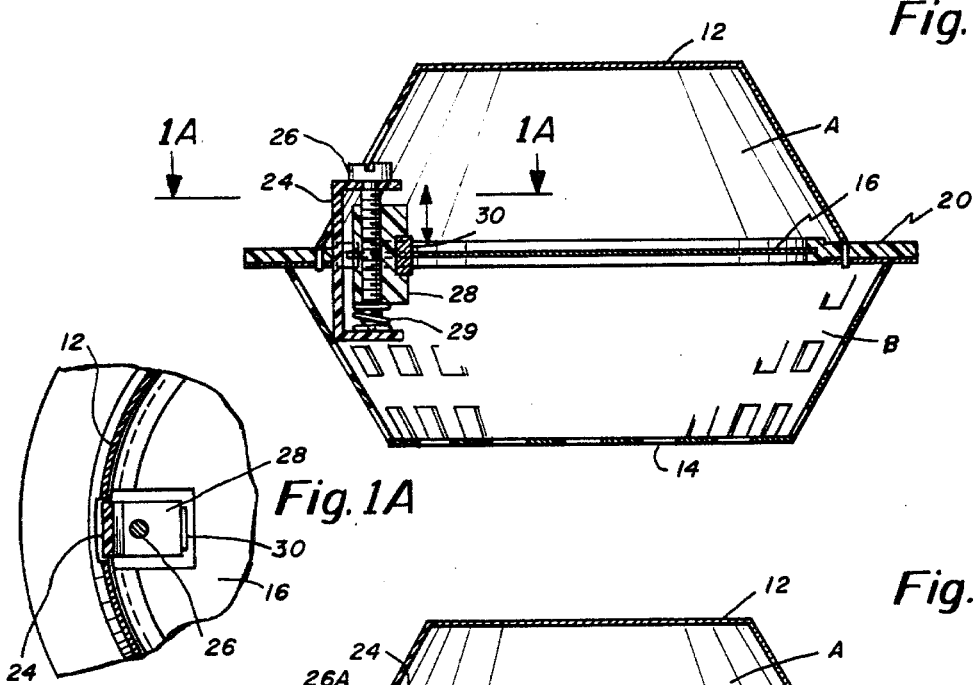
Fig. 1
Fig. 1A
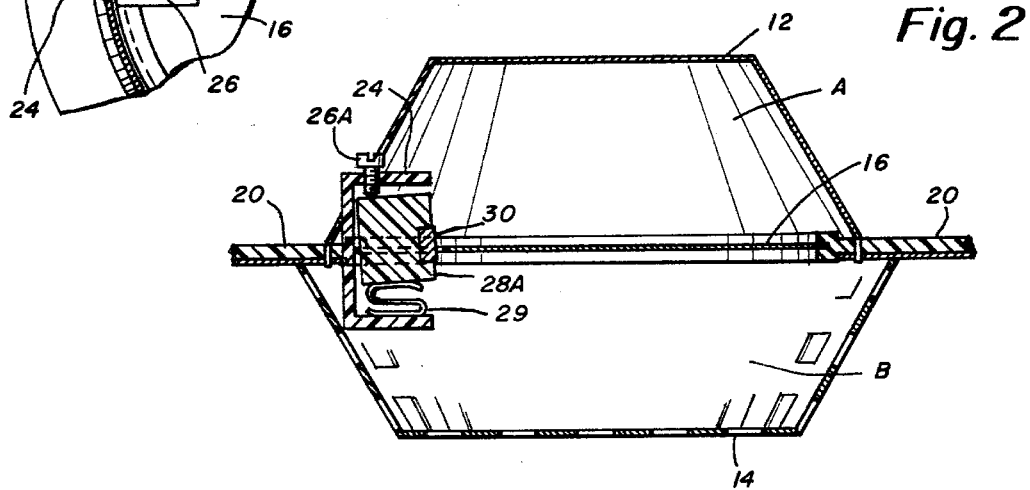
Fig. 2
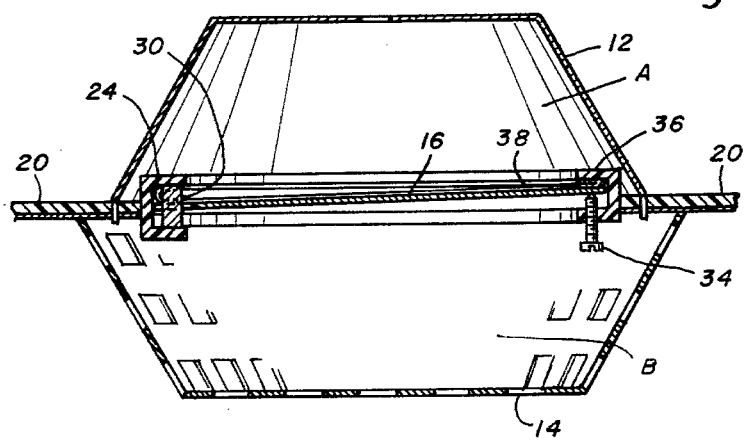
Fig. 3

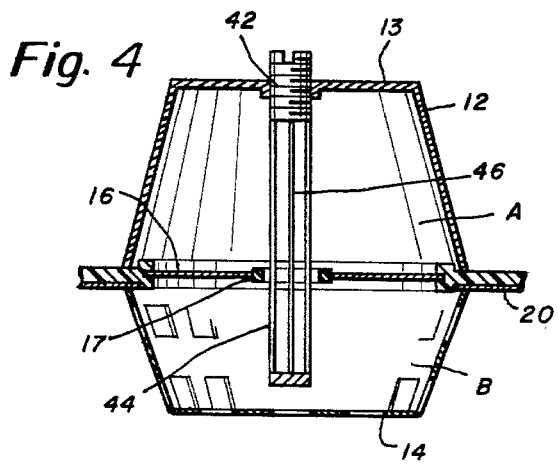
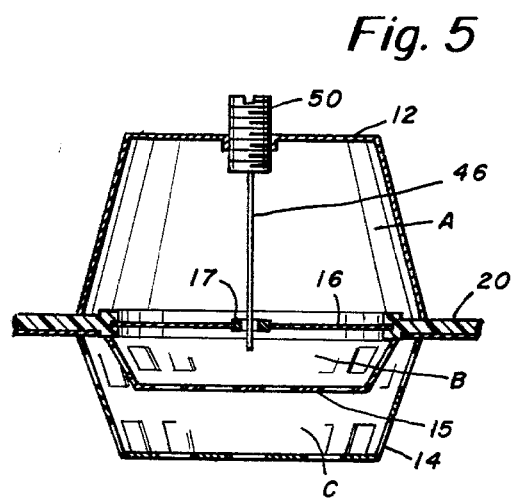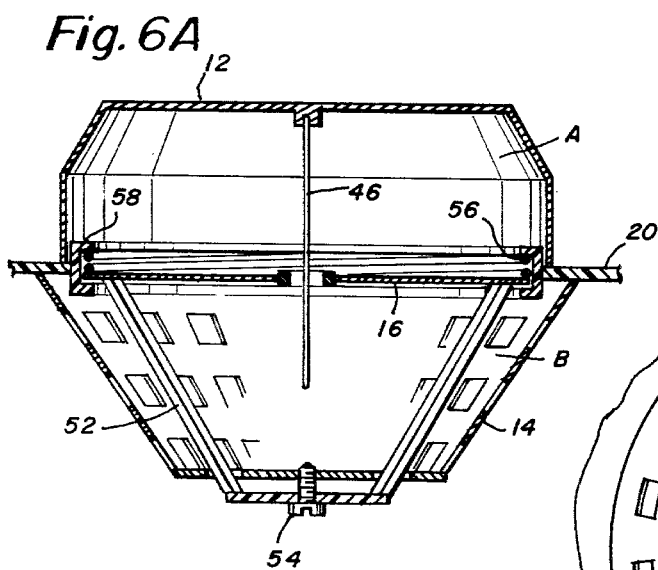
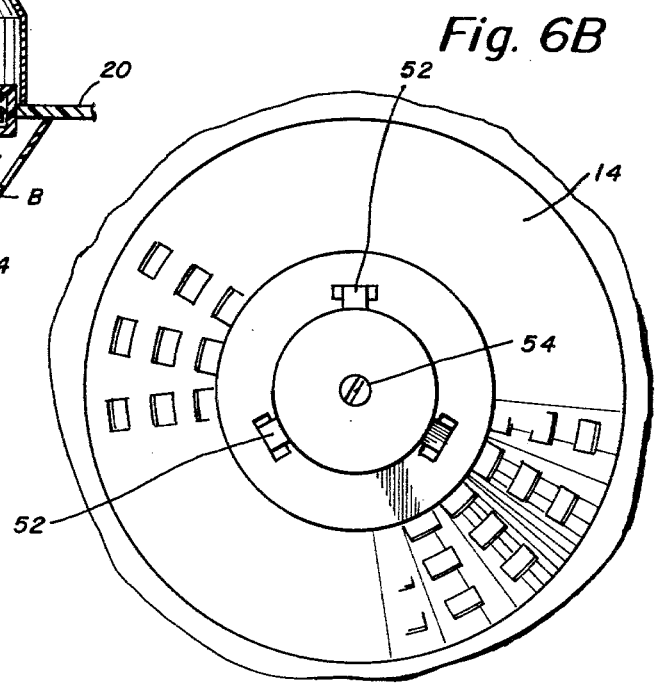
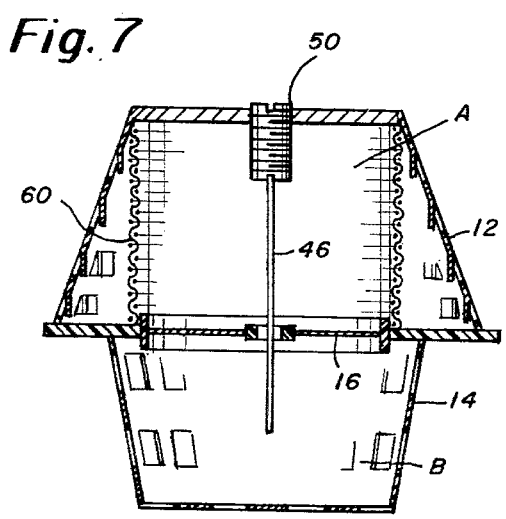

MULTIPLE CHAMBER IONIZATION DETECTOR

BACKGROUND OF THE INVENTION

The present invention relates in general to ionization detectors, and more particularly, to an ionization detector of the multiple chamber type preferably employing only a single ionization source associated with each chamber of the detector.

Ionization detectors have recently found quite widespread usage especially in the residential area, brought about primarily by a decrease in cost of constructing these detectors. However, there is still a need for further improvement in performance without however, creating an attendant increase in the manufacturing cost of the detector. It is one purpose of the present invention to provide such improvement in performance without an increase in manufacturing cost.

There currently exists three basic types of ionization detectors including a single source/single chamber detector, a single source/dual chamber detector, and a dual source/dual chamber detector. The single source ionization detector is used with a single chamber having an outboard series resistor. When a single source is used with a dual chamber the radiation from the single source emanates through both chambers with there usually being provided a grid or opening separating the chambers to permit the radiation to emanate into both chambers. The most common construction is the dual source/dual chamber detector. This construction can also include a single source coated with radioactive material on both sides and placed between the chambers. Again, an opening may exist between the two chambers. Also included in this type is a dual chamber housing having a source disposed in each chamber.

In a dual chamber construction employing a single source, the ionization is strictly dependent upon the geometry of the chambers and the relative position of the orifice between chambers that permits ions to penetrate into the second chamber. The specific activity of radioactive sources may vary and thus means are usually provided for compensation for this variation. It is typical to achieve this adjustment by adjusting the position of the source closer to or further away from the center electrode or, alternatively, by moving electrodes relative to each other. In this instance, if a source is connected to an electrode, then the electrode and source are moved in unison. With the dual chamber construction and the use of only a single source, generally the opening between chambers has to be quite large, however, this results in reduced sensitivity especially for slow smoldering fires due to the likelihood of combustion particles reaching the reference chamber.

When two sources are used in a dual chamber construction, one source is associated with each chamber. Tolerances of each source may lead to an imbalance between the ionization in each chamber. In the dual chamber construction similar adjustment means may be used as previously discussed with regard to the single ionization source arrangement. Additionally, an ion-capturing means may be employed such as the one shown in U.S. Pat. No. 4,021,671. Also, in the two-source embodiment, this requires two sources and two supports for the source thus complicating the construction and making for a more costly detector.

Accordingly, it is one object of the present invention to provide an approved dual chamber ionization detector, one in which only a single source is employed being associated with both chambers of the detector.

Another object of the present invention is to provide a multiple chamber ionization detector having infinite and readily simple adjustment of the ionization in each chamber of the detector.

A further object of the present invention is to provide a multiple chamber ionization detector that does not require very precise tolerances of mechanical parts and the very precise tolerances of the radioactive source itself.

Still another object of the present invention is to provide an ionization detector that is of relatively simple construction and that is relatively uncomplex and that is capable of manufacture at a relatively inexpensive manufacturing cost.

Still another object of the present invention is to provide a detector that uses only one ionization source and yet does not sacrifice performance with the use of only one source. With this detector the long term decay of the source is automatically compensated for because of the use of only one source and the ratio of ionization is maintained constant in each chamber even after this long term decay of the output of the source.

Still a further object of the present invention is to provide an ionization detector that is readily adapted for use with almost any type of approved radiation source including, for example, a beta ionization source.

SUMMARY OF THE INVENTION

To accomplish the foregoing and other objects of this invention there is employed preferably a single radioactive source in a detector construction comprising at least two chambers with a center or node electrode. In one basic embodiment of the invention the detector comprises first and second chambers having electrode means associated with the chambers including a common or center electrode. The radioactive source is preferably disposed in association with this common electrode and means are included for providing adjustable positioning between the radioactive source and the common electrode to alter the proportion of the source that protrudes into each chamber.

In one version of the present invention there is provided a single source used in a dual chamber construction with the source generally provided in the plane of the center or node electrode. In this version of the invention the source is mounted in a holder which provides for adjustable positioning of the source relative to the center or common electrode. This adjustment essentially does not change the geometry of either of the chambers but does alter the ratio of the source area protruding into each chamber, in this way providing for adjustment of the ionization current in the chambers. In another embodiment of the present invention the position of the source is adjusted by means of tilting. In still another embodiment of the present invention the adjustment is provided by adjusting the position of the common electrode rather than the source so as to tilt the common electrode in relationship to the position of the source which is fixed in position.

In accordance with a still further embodiment of the present invention there may be provided a radioactive pin, rod, wire, ribbon or foil that protrudes into two or more chambers. In the basic embodiment a two-chamber construction is used. However, the concepts of this invention may also be applied to a triple chamber arrangement such as shown in U.S. Pat. No. 4,021,671. In this connection it is noted that it may be possible to dispense with the particle capturing member shown in this patent when employing the concepts of this invention.

BRIEF DESCRIPTION OF THE DRAWINGS

Numerous other objects, features and advantages of the invention should now become apparent upon a reading of the following detailed description taken in conjunction with the accompanying drawings, in which:

FIGS. 1 and 1A depict a dual chamber construction for an ionization detector employing a single source in accordance with the invention wherein the source is movable relative to a fixed center electrode;

FIG. 2 shows a second embodiment of the present invention also for a dual chamber ionization detector wherein the source is titled for adjustment purposes;

FIG. 3 shows a third embodiment of the present invention wherein the source is fixed in position and the center or common electrode is movable for adjustment of ionization in each chamber;

FIG. 4 shows still a further embodiment of the present invention wherein the radioactive source is in the form of a pin, rod, wire, ribbon or the like supported on a carrier;

FIG. 5 shows a further embodiment of the present invention used in a three-chamber detector;

FIGS. 6A and 6B show a further embodiment of the present invention employing an elongated fixed radioactive source in combination with a common electrode that may be moved or tilted relative to the source; and FIG. 7 shows still a further embodiment of the present invention including an elongated movable source and a dual chamber construction but including an additional internal mesh or louvered electrode.

DETAILED DESCRIPTION

FIG. 1 shows a first embodiment of the present invention illustrated in a somewhat schematic fashion. For a more detailed description of a general two-chamber detector, reference is made to U.S. Pat. No. 4,021,671. In the detector, such as the one shown in this prior art patent, the electrodes, such as the electrodes 12 and 14 have a biasing potential applied thereto for establishing an ionization current in the chambers A and B. It is typical in a dual chamber construction to sense outputs from the center, common, or node electrode 16 also depicted in FIG. 1. The electrode 14 may be of mesh construction, so that the chamber B is quite open. On the other hand, the chamber A is substantially closed except for a small hole to atmosphere. A hole may also be provided through electrode 16. The electrodes 12, 14 and 16 of course, are conductively separated and may be supported from a printed circuit board 20 such as also shown in the prior art U.S. patent referred to herein.

In accordance with the present invention there is associated with the ionization detector of FIG. 1 a holder 24 which is suitably supported within the detector. This holder, may be supported, for example, from the printed circuit board 20 forming a main support of the detector. The holder 24 supports an adjusting screw 26 which in turn supports retainer 28. The retainer 28 supports the radioactive source 30 which may be a beta ionization source. The retainer 28 may be internally threaded to receive the adjusting screw 26. A spring 29 is disposed at the bottom of the retainer 28 for providing a biasing force on the retainer 28. With the arrangement shown in FIG. 1 including the holder 24 and adjusting screw 26, by turning of this screw 26, the source 30 may be moved vertically so that different proportions of the source extend into chambers A and B. In this way adjustment of the ionization current through the chambers A and B can be accomplished quite easily without the need for moving main electrodes or providing some supplementary adjusting means.

The embodiment of FIG. 2 is quite similar to the embodiment shown in FIG. 1 except that the source 30 is adjusted by tilting rather than by movement normal to the common electrode 16. In the embodiment of FIG. 2 there is shown the electrodes 12, 14 and 16 supported from the printed circuit board 20. There is also provided the holder 24 for supporting therein spring 29, adjusting screw 26A, and retainer 28A. The screw 26A, as depicted, is offset from the center vertical axis of the retainer 28A so that adjustment of the adjusting screw 26A causes a tilting of the source essentially about the plane of the common or center electrode 16. This adjustment provides a change in the ion efficiency and emanation in each of the chambers A and B. In both embodiments of FIG. 1 and 2 it is noted that there are passages between chambers A and B defined in the general vicinity between the holder 24 and the common electrode 16.

FIG. 3 shows still a further embodiment of the present invention employing the same basic dual chamber construction including electrodes 12, 14 and 16 supported from the printed circuit board 20. However, in this arrangement rather than tilting the source 30 relative to the center electrode 16, the center electrode itself is tilted while the source 30 is maintained stationary with relationship to other electrodes. In FIG. 3 the source 30 is shown supported by a holder 24 and the common, center or node electrode is supported by a second holder 36. The holder 36 also supports a spring 38 and an adjusting screw 34. The spring extends about the periphery of electrode 16. The movement of the adjusting screw 34 causes a tilting of the common electrode 16 which has the net effect of changing the ionization current in each of the chambers A and B. In this arrangement the geometry of the two chambers A and B is changed by movement of the common electrode, however, this change is only very slight especially in view of the fact that only a relatively small movement is necessary to provide the calibrating adjustment in accordance with this invention.

FIG. 4 shows another embodiment of the present invention also in the form of a dual chamber detector including electrodes 12, 14 and 16 and the printed circuit board support 20. Within the top of the electrode 12 there is provided a carrier 42 having a slot at the top thereof so as to provide an adjusting screw. In this connection there may be provided a top member 13 which may or may not form a part of the electrode 12 and which has an internally threaded aperture for receiving the carrier 42. The carrier 42 supports an elongated support member 44 encapsulating a radio isotope pin or rod 46 or the like. The member 46 may also be a wire or ribbon. The common electrode 16 also preferably has an insulated bushing 17 for separating this electrode from the support member 44. Member 44 may comprise a plurality of elongated bars or the like that are either metallic or insulating.

FIG. 5 illustrates schematically the adjustable single source used with a three-chamber detector construction including chambers A, B and C. In this connection there are provided negative electrodes 12 and 14 and a positive electrode 15.

All of these electrodes are supported from the common support 20 as was the case in the embodiments of FIGS. 1-4. There is also provided an insulating bushing 17 in the common electrode 16 for accommodating the elongated radioactive source 46. The top electrode 12 includes means for receiving the adjusting screw 50 which holds the radioactive source 46. By rotational adjustment of the screw 50 the ratio of the area of the source 46 in the chambers A and B is changed to thereby alter and control the ionization current within all chambers of the detector.

FIGS. 6A and 6B show still a further version of the present invention wherein the radioactive source 46 is fixedly secured to the electrode 12 or at least to a support point associated with the electrode 12. The common electrode 16 is apertured at its center for receiving the elongated source 46 extending between the chambers of the detector. Within chamber B there is provided an insulating tripod 52 which interconnects between the periphery of electrode 16 and an adjusting screw 54. A circular spring 56 extends within the holder 58 for biasing the electrode 16 in a downward direction. However, an adjusting screw 54 may be turned to operate the tripod 52 for moving the electrode 16 in a generally vertical direction. Thus, the adjustment in accordance with this adjustment is provided by having a source 46 fixed in position and moving the common electrode 16 in a direction to vary the ratio of the area of source 46 that is disposed in each of the chambers A and B.

FIG. 7 shows still a further embodiment of the present invention. This version is substantially the same as the one shown in FIG. 5 except that there are provided only chambers A and B. However, this arrangement does include an additional internal mesh or louvered electrode 60. The purpose of this internal electrode is to obtain additional baffling to air movement and also to insure correct spacing of the electrode from the source. The outer electrode serves basically to enclose the adjustment means including adjusting screw 50.

What is claimed is:

1. An ionization detector comprising;
   means defining at least first and second chambers,
   electrode means associted with the chambers including a common conductive wall means defining a common electrode between chambers and defining at least a side of each chamber,
   a radioactive source common to both chambers and having portions thereof disposed in each chamber,
   means providing adjustable positioning between the source and common electrode to alter the proportion of the source that is disposed in each chamber,
   and means coupled from said common electrode for sensing changes in ionization current.

2. An ionization detector as set forth in claim 1 including means for supporting the common electrode fixed relative to other electrodes and said means for positioning includes a holder for the source and means for moving the holder generally normal to the plane of the common electrode.

3. An ionization detector as set forth in claim 1 including means for supporting the source fixed relative to the other electrodes and said means for positioning including means for deflecting the common electrode relative to the fixed source.

4. An ionization detector as set forth in claim 2 wherein said holder includes a biasing means.

5. An ionization detector as set forth in claim 1 wherein one of said chambers has access means to said means providing adjustable positioning.

6. An ionization detector as set forth in claim 1 wherein said means for positioning includes a holder for the source and means for supporting the holder from one of the other electrodes so that the source extends toward and through the common electrode.

7. An ionization detector as set forth in claim 6 wherein the source is in the form of an elongated rod.

8. An ionization detector as set forth in claim 1 wherein said detector comprises three chambers.

9. An ionization detector as set forth in claim 1 wherein said means for positioning includes a member supporting the common electrode and adjustment means associated with the member operable from external of the chambers for moving the common conductive wall relative to a fixed position source to alter the proportion of the source that is disposed in each chamber.

10. An ionization detector as set forth in claim 3 wherein said means for deflecting includes means for tilting the plane of the common electrode from a normal position.

11. An ionization detector as set forth in claim 4 wherein said biasing means includes a biasing spring.

12. An ionization detector as set forth in claim 9 wherein said common conductive wall is moveable to alter chamber area with one chamber becoming larger as the other becomes smaller.

13. An ionization detector as set forth in claim 12 including biasing means for urging the common electrode to a stationary position.

14. An ionization detector as set forth in claim 9 wherein said supporting member comprises a support leg construction.

* * * * *